(12) United States Patent
Lee

(10) Patent No.: US 9,460,640 B2
(45) Date of Patent: Oct. 4, 2016

(54) MODULAR PULSE DUPLICATOR SYSTEM FOR SIMULATION OF CARDIOVASCULAR HEMODYNAMIC FUNCTIONS

(71) Applicant: Shouyan Lee, Rancho Santa Margarita, CA (US)

(72) Inventor: Shouyan Lee, Rancho Santa Margarita, CA (US)

(73) Assignee: Medical Implant Testing Lab, Inc., Rancho Santa Margarita, CA (US)

( * ) Notice: Subject to any disclaimer, the term of this patent is extended or adjusted under 35 U.S.C. 154(b) by 217 days.

(21) Appl. No.: 14/049,068

(22) Filed: Oct. 8, 2013

(65) Prior Publication Data

US 2014/0099620 A1    Apr. 10, 2014

Related U.S. Application Data

(60) Provisional application No. 61/710,971, filed on Oct. 8, 2012.

(51) Int. Cl.
*G09B 23/30*    (2006.01)
(52) U.S. Cl.
CPC ............. *G09B 23/30* (2013.01); *G09B 23/303* (2013.01)
(58) Field of Classification Search
CPC ..... G09B 23/28; G09B 23/30; G09B 23/303
See application file for complete search history.

(56) References Cited

U.S. PATENT DOCUMENTS

| 5,632,623 | A | * | 5/1997 | Kolff | ...... | G09B 23/28 |
| | | | | | | 434/267 |
| 2009/0226867 | A1 | * | 9/2009 | Kalafut | ...... | G09B 23/32 |
| | | | | | | 434/268 |
| 2011/0303026 | A1 | * | 12/2011 | Lee | ...... | A61F 2/2472 |
| | | | | | | 73/866.4 |

* cited by examiner

*Primary Examiner* — Robert J Utama
*Assistant Examiner* — Jennifer L Korb
(74) *Attorney, Agent, or Firm* — WPAT, P.C., Intellectual Property Attorneys; Anthony King

(57) ABSTRACT

A versatile multi-function modular pulse duplicator system having multiple modules each universally and fluidly connected to each other via universal connectors. Each module being detachable from another module and the plurality of modules can be rearranged in different sequence or quantity as the user desires for specifically designed hemodynamic simulations. Some modules have specific functions by having a pump, a compliance chamber, a resistance mechanism, or a fluid reservoir. Optional peripheral modules that simulate anatomical subsystems can be fluidly coupled within this system of modules, allowing studying/training/product demonstration in the subsystem specifically provided, under desired cardiovascular hemodynamics. The use of universal connectors, peripheral modules, and selectively attachable/detachable modules, make this a versatile system where a user can design a simulation according to the specifics needed for product testing, product demonstration, surgical training, teaching and researching.

18 Claims, 12 Drawing Sheets

MODULAR PULSE DUPLICATOR SYSTEM FOR SIMULATION OF CARDIOVASCULAR HEMODYNAMIC FUNCTIONS

CROSS-REFERENCE TO RELATED APPLICATIONS

This application claims priority to U.S. Provisional Pat. Application No. 61/710,971, filed on Oct. 8, 2012, now pending, which is herein incorporated by reference in its entirety.

BACKGROUND OF THE INVENTION (1) Field of the Invention

The field of the invention is medical testing, training, and simulation devices and methods, more specifically, a pulse duplicator sufficiently versatile to simulate user-designed cardiovascular hemodynamic function for purposes such as product testing, researching, product demonstration, and surgical training.

(2) Description of Related Art including Information Disclosed under 37 CFR 1.97 and 1.98

Pulse duplicator system was introduced in 1980s as a tool to evaluate the hydrodynamic properties of prosthetic heart valves. It was also used later for various simulation of blood circulation. However, known systems were all specifically designed to serve a single specific application. For example, a pulse duplicator system designed for surgical valve testing is not versatile for other types of testing/simulation. Any modification to use it for other applications, such as simulating a stent delivery, would inevitably require significant irreversible design changes and experiment which often led to a complete redesign of the original pulse duplicator system. While modification requires time, expense, and specialized knowledge, purchasing a different duplicator system for each application is just too costly to be feasible for most users.

There is a continuing need for a pulse duplicator that is sufficiently versatile to perform various types of simulation and testing. There is also a continuing need for a method allowing those skilled in the art to easily and reversibly adjust a pulse duplicator to suit various specific applications without irreversibly destroying its ability for its original application.

All referenced patents, applications and literatures are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply. The invention may seek to satisfy one or more of the above-mentioned desires. Although the present invention may obviate one or more of the above-mentioned desires, it should be understood that some aspects of the invention might not necessarily obviate them.

BRIEF SUMMARY OF THE INVENTION

This invention is a versatile multi-function modular pulse duplicator system having multiple modules detachably attached to each other to form a user-designed simulation. This system can be easily reversibly redesign to fit various applications by simply rearranging the modules and by introducing new modules where needed for specific applications.

Central to this invention is the use of modules having specialized functions, and its ability for a user to couple it to other modules. One of the specialized modules contemplated is a pump module. Contemplated pump module can have an arbitrary waveform pulsatile flow pump to simulate the ventricular function. Another specialized module contemplated can have a compliance to simulate blood vessel compliance. Yet another contemplated specialized module can have a user-adjustable flow resistance mechanism in the compliance module, or independently disposed by itself in a separate module, to simulate blood flow resistance. Also contemplated specialized module can be a valve module to hold a prosthetic valve (e.g., atrial-ventricular or pulmonary/aortic valve) within the system to direct a flow direction, and/or for valve-testing purposes. Further contemplated specialized module includes a reservoir module having a fluid reservoir to simulate atrium function.

While many of the specialized modules are disclosed herein as serving only one specialized function, e.g., pump module having only a linear motor to drive fluid flow in the circulation, it is also contemplated that a specialized module can combine two or more of the disclosed structures (i.e., linear motor, compliance chamber, reservoir, resistance mechanism, valve holder) to perform multiple functions in one module, e.g., a single module having a pump and two valve holders to hold valves in its through channel. One skilled in the art will recognize such design are also feasible and can be preferable to simplify assembly process.

As an added advantage for versatility, the contemplated system allows insertion of another type of modules called peripheral modules. The peripheral modules are inserted by a user for user-designed hemodynamic simulation for purposes specifically sought by the user. The general guideline in arranging these modules is to have a circulation flow that is generally anatomically similar to human anatomy. By inserting one or more additional peripheral modules, a user is now given the ability to amplify a specific body organ, body region, or subsystem, to simulate/study/observe. For example, a user may insert a peripheral module into the system with detailed structure imitating coronary sinus such that the user may now observe, study, train, the implantation of a drug-eluding stent in the coronary sinus.

In the preferred embodiment, the system may have a number of peripheral modules available for use/assembly, each to simulate an individual peripheral system. A user may install only one peripheral module in a system. A user may also install more than just one peripheral module in building a contemplated simulation system. Both applications are feasible, and the appropriateness of each is entirely decided by the user base on its intended purposes.

It will be described in further detail as to how these modules can be arranged and rearranged to achieve various types of simulations. All of the contemplated modules are capable of coupling to each other. Certain applications may only require some of the modules. While many modules will have four or more exiting holes, some will only have two. Unused exiting holes can be selectively capped off, allowing the user to design a desired direction of fluid flow in that particular module to be straight, angled, bifurcated, or a three-way split. And according to specific needs of some simulation types, not all of the modules would be required. The contemplated modules can be directly connected to another module without the need for any connectors/fittings/tubes. Optionally and preferably, contemplated modules are connected to one another by using universal connectors, including fittings, pipes, hoses, and couplers, allowing easy and secure fastening and disassembling.

In yet other embodiments, the system has a drain, temperature sensors, pressure transducers, a heater, flow meters, and a microprocessor to control and monitor these simulations. Also in other embodiments, the modules (in whole or in part) are made of a transparent material so that content (e.g., a fluid, a valve, a stent) of the module can be easily observed by the naked eye.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

It should be noted that the drawing figures may be in simplified form and might not be to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

As used herein, the term "specialized" in conjunction with a module refers to the fact that such module performs more than merely acting as a conduit. It is not intended to mean having only one function. A specialized module can have more than one function, for example, being a pump module and a valve module.

As used herein, the term "exiting" in conjunction with a hole of a module refers to the fact that fluid within the through channel is capable of exiting from such hole if the hole is uncapped. By calling it an "exiting" hole is not meant to define a direction of the circulating flow within the corresponding through channel. In other words, an "exiting" hole as disclosed herein can be ingress or an egress for fluid passing through such module.

The inventor have discovered a novel way allowing researchers, surgical trainers, product demonstrators, to easily design and modify a simulation system using fluidly connecting modules that can be relatively easily assembled and reassembled using universal connectors.

Figure 1:
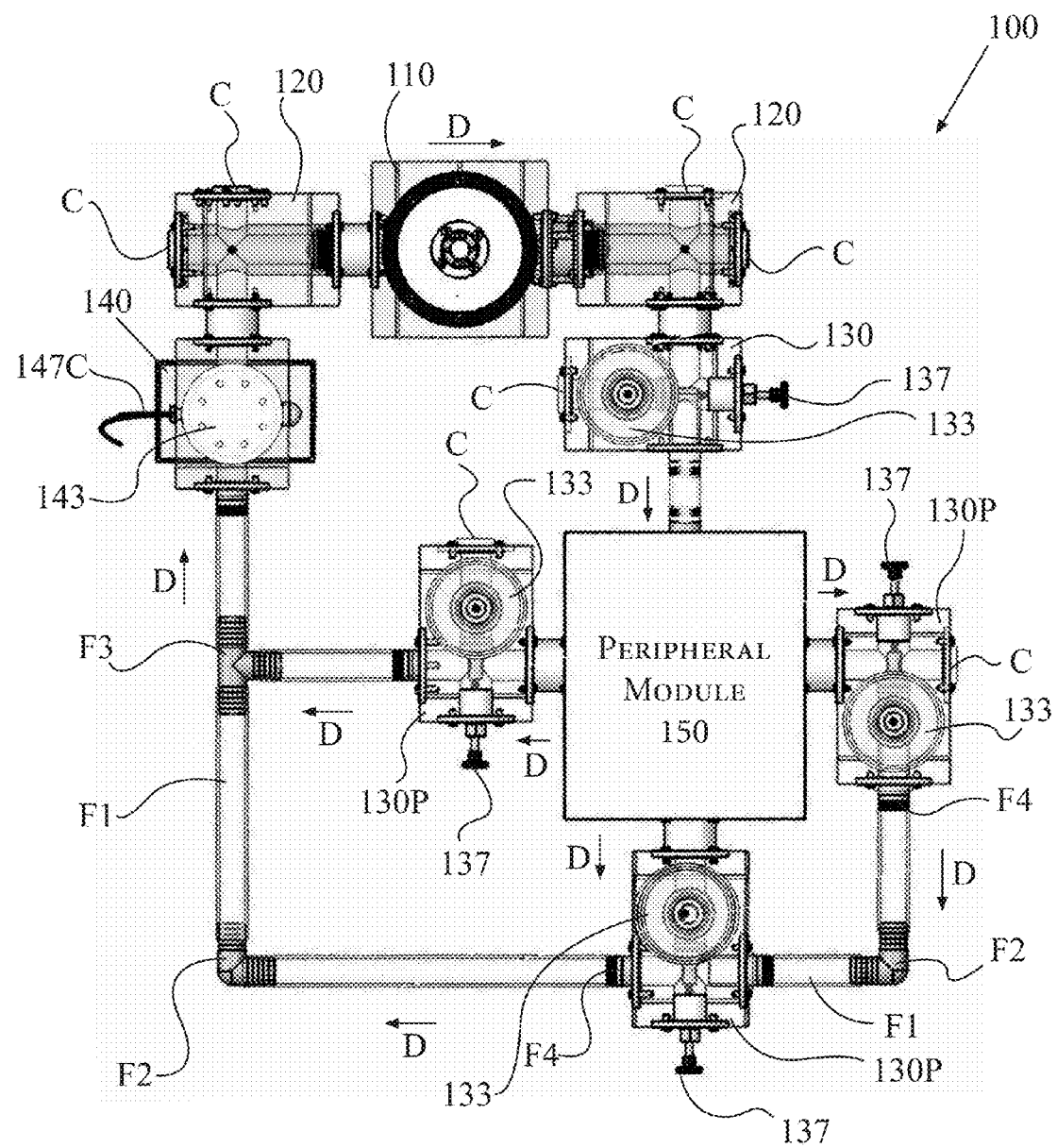
FIG. 1 is a top view of a first embodiment of a modular pulse duplicator system where some of the contemplated modules are coupled together forming a fluidly connecting loop, according to an aspect of the inventive subject matter.

FIG. 1 generally depicts multi-purpose versatile modular pulse duplicator system 100 that simulates cardiovascular hemodynamic functions. The system 100 has a plurality of modules each having at least one through channel, wherein the plurality of modules are detachably and fluidly coupled to each other forming a fluidly connecting circulating flow via the through channels of each module. The modular pulse duplicator system has been arranged in FIG. 1 to include a pump module 110 fluidly coupled to a valve module 120 (to simulate aortic valve) having a valve (not shown) installed in its through channel, which is fluidly coupled to a compliance/resistance module 130, which is in turn fluidly coupled to a peripheral module 150, then from which the circulating flow (arrow D) is split three ways into three separate peripheral compliance/resistance modules 130P. The circulating flow exiting all three peripheral compliance/resistance modules 130P then merge into a single flow and then enters a reservoir module 140, which is fluidly coupled to another valve module 120 (to simulate mitral valve). The details of each above-mentioned module will be discussed below.

Here in FIG. 1, the peripheral module 150 is shown as a big blank square because a peripheral module 150 can come in many shapes, forms, and sizes. Allowing insertion of a peripheral module 150 anywhere in system 100 is a key aspect of the instant invention. Contemplated peripheral module 150 is meant to structurally imitate an anatomical body organ system. This essentially allows a researcher to single out an organ, or a subsystem of the human body for studying/researching/training/demonstrating, by amplifying it using a peripheral module/model having detailed structures.

The various modules in system 100 are fluidly coupled together using plurality of universal connectors including fittings, pipes, and couplers (90 degree elbow coupler, 45 degree coupler, tee coupler), each having a through channel, said universal connectors are adapted to fluidly connect at least two of the contemplated modules.

The plurality of modules shown in FIG. 1 are adapted to be detached from each other, becoming free standing pieces, and then be reattached to each other having a different sequence order or having a different quantity of modules, forming yet another fluidly connecting circulating flow via the though channels of the modules.

Figure 2:
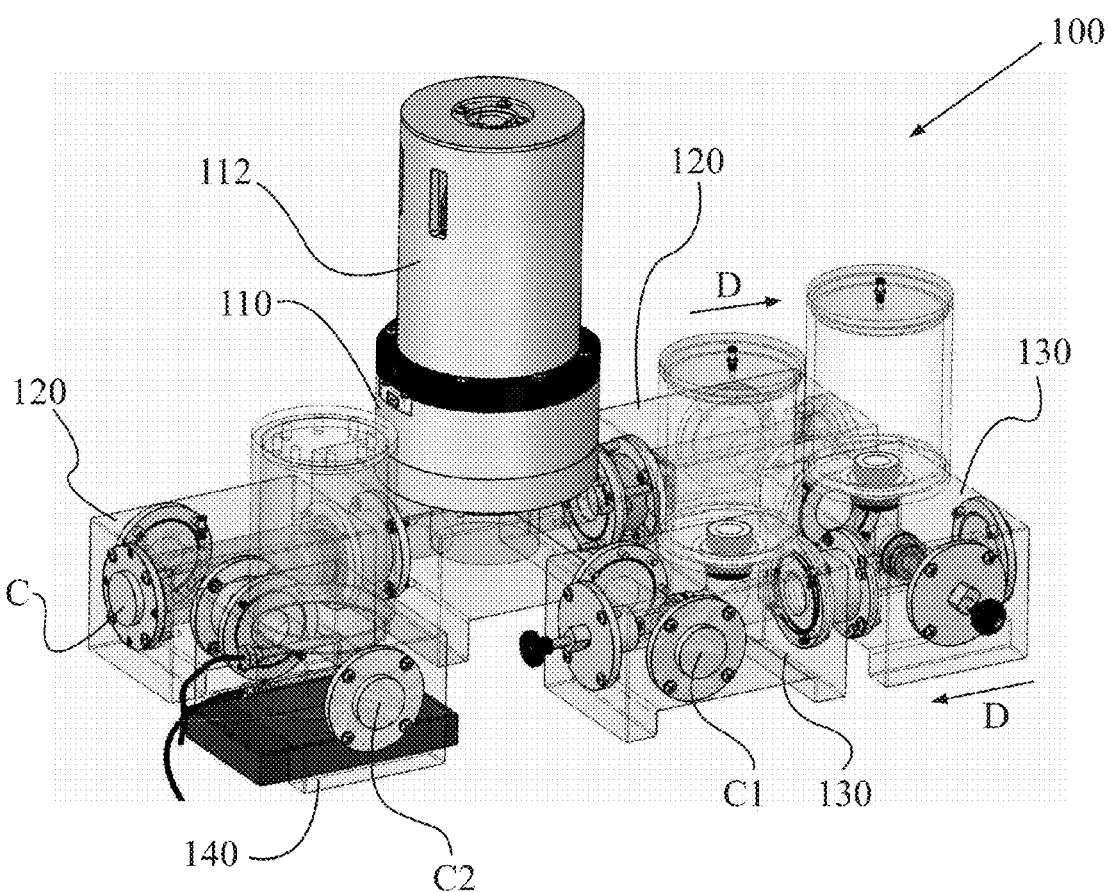
FIG. 2 is a perspective view of a contemplated embodiment of a modular pulse duplicator system where the modules are arranged differently from that shown in FIG. 1. Note that the arrangement in FIG. 2 is one that has not yet formed a complete loop of circulating flow. The arrangement shown in FIG. 2 is ready to be connected to additional modules by first removing at least caps C1 and C2.

FIG. 2 is another simulation design where its circulation flow has not been completely assembled. Here, a pump module 100 is fluidly coupled to a valve module 120, from which the circulating flow (arrow D) is led into compliance/resistance module 130, which is fluidly coupled to yet another compliance/resistance module 130 having a cap C1 to sealingly close off one of its exiting holes. To complete this simulation design, a user would unscrew the four screws closing the cap C1, and make this exiting hole available for connection. This exiting hole can connect to one of many peripheral modules 150, or any one or a series of modules, or merely connect to universal connectors and tubes, eventually leading the circulating flow into the exiting hole capped off by cap C2. Cap C2 is shown as closing off an exiting hole of a reservoir module 140, which is fluidly coupled to a valve module 120, which is in turn fluidly coupled to the pump module 110.

One skilled in the art would immediately appreciate that the direction of circulating flow (arrow D) is dictated by the direction of the valves installed in the valve modules 120. For illustration purposes, one should assume that the valves (not shown) are properly installed in a direction so as to correlate with the direction of circulating flow as indicated by arrow D.

Figure 3:
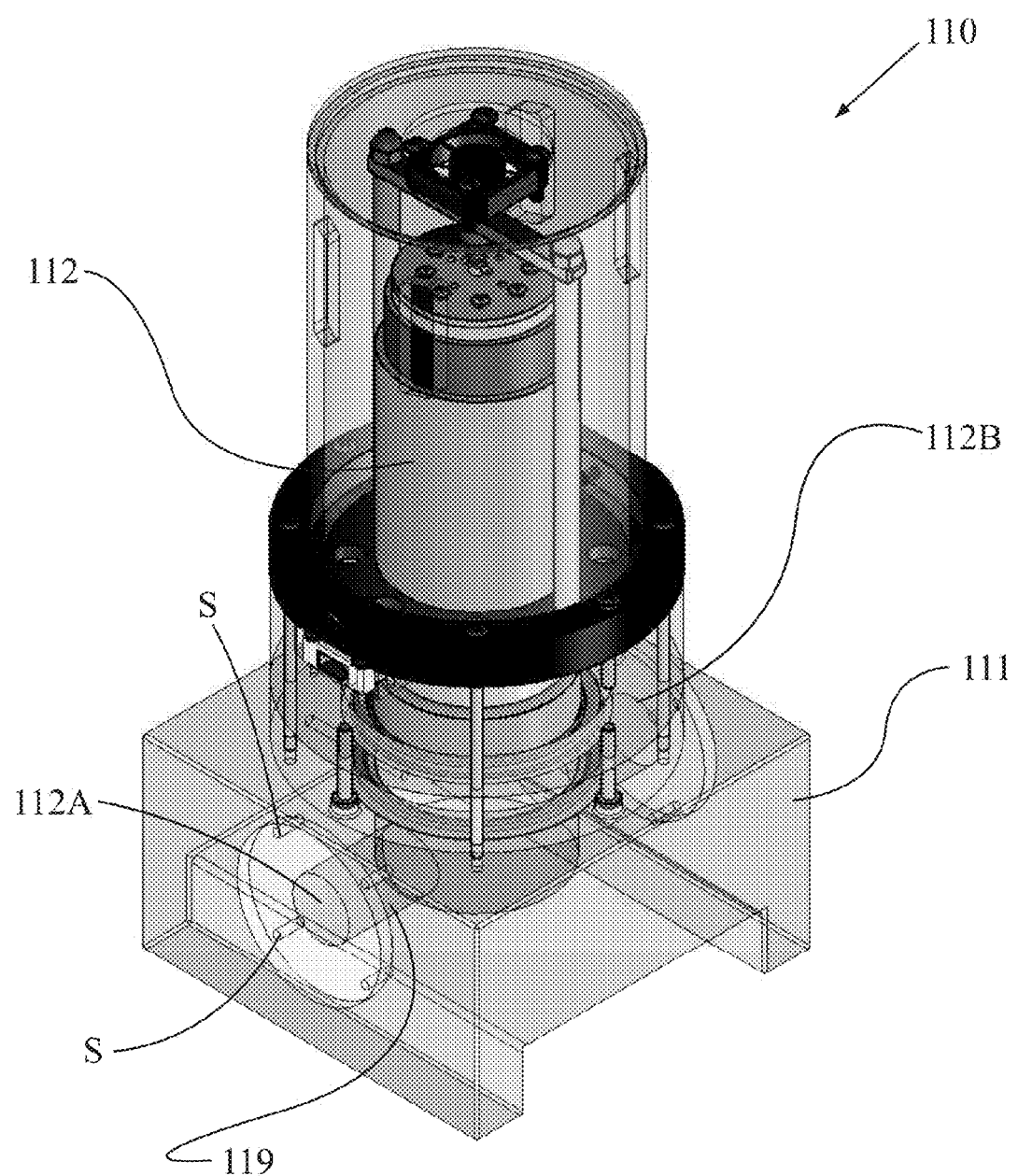
FIG. 3 is a perspective view of a contemplated pump module.

FIG. 3 shows the contemplated pump module 110 in more details. The pump module 110 has a linear motor 112 disposed within a transparent housing with ventilation ports, the housing is disposed on top of block body 111. As will be described below, most of the modules have a block body that is generally rectangular or square. Rectangular and square shapes and its relatively small footprint are preferred as such design makes designing and connecting a loop of multiple modules relatively easy, neat, and organized.

In a prefer embodiment, the block body 111 is a solid piece of transparent material such as acrylic. In alternative embodiments, the block body 111 (as well as any other block bodies of any other modules) can comprise of a hollow housing within which piping and other components are enclosed within.

In the preferred embodiment, the solid transparent material of the block body is drilled through to create its through channel or channels. Here in FIG. 3, only one through channel 119 is created, resulting in two exiting holes 112A and 112B. Within close proximity to the exiting holes 112A, 112B are four screw receiving holes S. Screw receiving holes S are preferred in one embodiment to help sealingly connect modules together using universal connectors such as fittings F4, couplers F2, F3, and pipes F1 as shown in FIGS. 1 and 11.

The connectors are preferred to be universal to ensure greater freedom for a user to assemble these modules in different ways. Although the connectors are preferred to be truly universal (i.e., one size fits all), some variation can be expected. Therefore, the term "universal" is used herein to loosely define both "one size fits all" as well as embodiments where some size variation exists. In the connectors shown in FIG. 1, one skilled in the art will easily recognize that the peripheral module 150 is connected to three peripheral compliance/resistance modules 130P via relatively shorter connecting pipes, each having a relatively larger diameter.

The peripheral compliance/resistance module 130P that is shown underneath the peripheral module 150 in FIG. 1 has two short fittings F4 fastened over two of its exiting holes. Its fourth exiting hole is shut by the resistance adjustable knob 137. A user may adjust a position of a plug 138 thereby selectively applying various degrees of flow resistance within the through channel. The circulating flow, however, does not flow pass through the adjustable knob 137. The two short fitting F4 can attach to pipes F1 of various lengths using conventional fastening structures, such as having complementary spiral blades to screw sealingly and tightly onto short fitting F4. A user can freely use a number of different types of couplers F2 to change directions, converge flow, or split flow. In FIG. 1, there are 90 degree elbow couplers F2, and tee couplers F3. Any shapes and sizes of couplers known in the plumbing art can also be implemented here. Therefore, the connectors disclosed in FIG. 1 are certainly not one-size-fits-all, but these connectors are sufficiently versatile so a user can connect these contemplated modules together in various ways.

Figure 11:
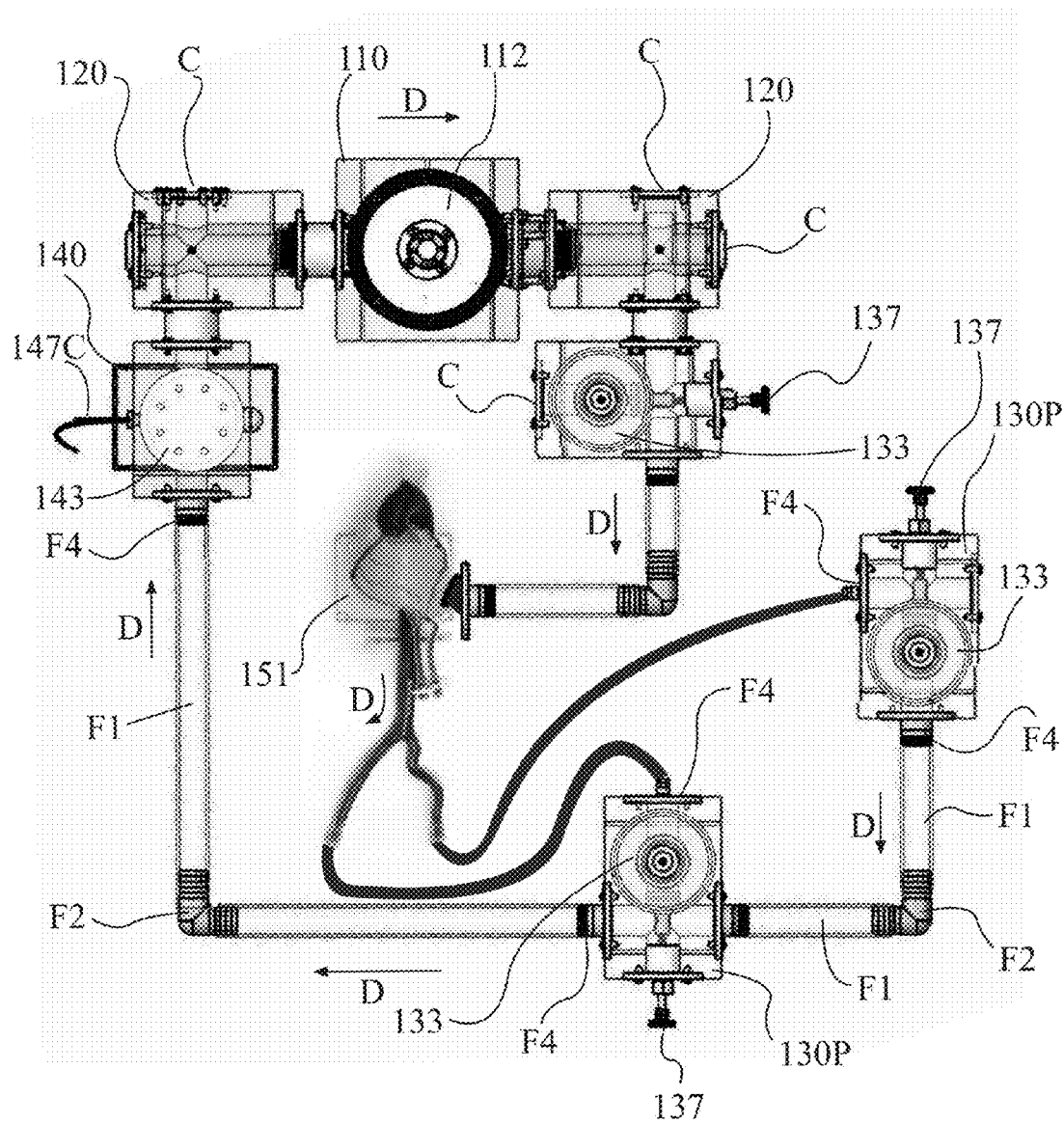
FIG. 11 is a top view of a yet another embodiment of a modular pulse duplicator system where some of the contemplated modules, and an off-the-shelf silicon model are coupled together forming a fluidly connecting loop, according to an aspect of the inventive subject matter.

While the pipes F1 appear to be stiff, rigid, straight pipes in FIGS. 1 and 11, flexible pipes, curved pipes, pipes with increasing/decreasing diameter, are also contemplated.

These connectors offer flexibility to system 100 such that if needed, some of the modules can be arranged elevated from other modules to simulate higher/lower extremity in a human body. This is to also mean that, although all of the drawing figures show an embodiment where all of the modules on arranged and installed on the same horizontal plane, other contemplated embodiments include having these modules arranged and installed on an incline. In yet another embodiment, these modules are arranged and installed vertically one on top of another, at distances apart that imitate actual human vasculature/organ placement.

While screw holes S are illustrated in these drawings figures to receive screws as the fastener of choice, other types of fasters can also be used. For example, snap-on couplers, screw-on couplers, clamp-on couplers.

One skilled in the art would immediately appreciate that the linear motor has a reciprocating piston (not shown) to drive a fluid in the through channel 119. One skilled in the art would also appreciate that the piston can be sealingly surrounded by a diaphragm so that the piston would have a free range of reciprocating movement while the diaphragm prevents the fluid from leaking pass the piston. Other mechanically known methods to seal the piston (e.g., piston rings) can be used as an alternative.

In the preferred embodiment, the linear motor 112 is electronically connected to a microprocessor (not shown), or a computer system (not shown) allowing a user to control and adjust its driving waveform. The computer system collects information about the cardiovascular hemodynamic conditions (e.g., pressure, temperature, fluid flow speed) from pressure transducers, temperature sensors, flow meters, installed in system 100. They can be installed in some of the modules. Alternatively, they can also be installed in some of the universal connectors. This allows the user greater freedom in designing where within the circulating flow to collect information.

Figure 4A:
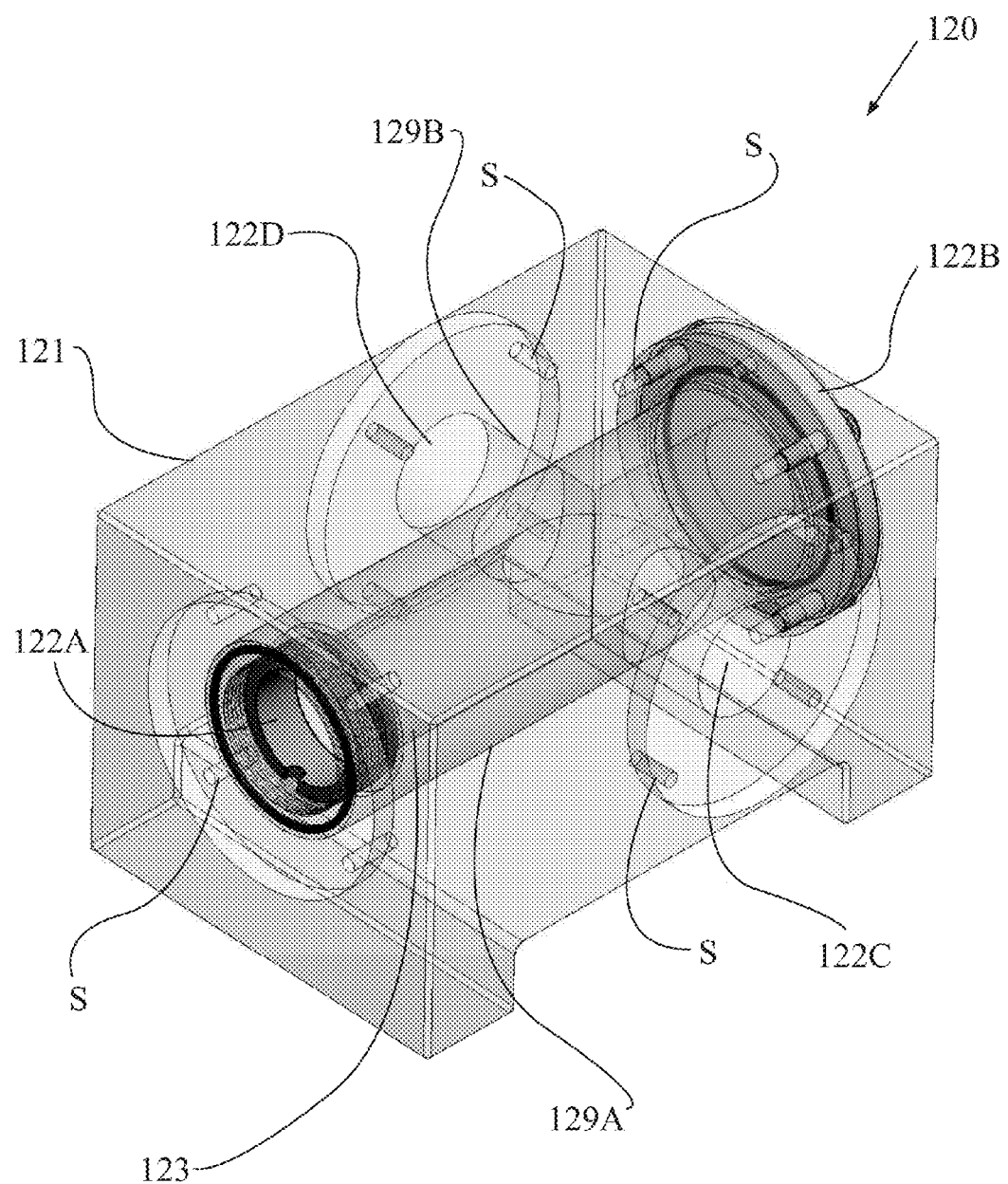
FIG. 4A is a perspective view of a contemplated valve module having a removable valve holder disposed within its through channel. This valve module is shown to have two through channels perpendicular to each other, intersecting and fluidly communicable with each other. All four exiting holes are shown as uncapped in this drawing figure. In operation, a user can selectively cap any of the exiting holes.
Figure 4B:
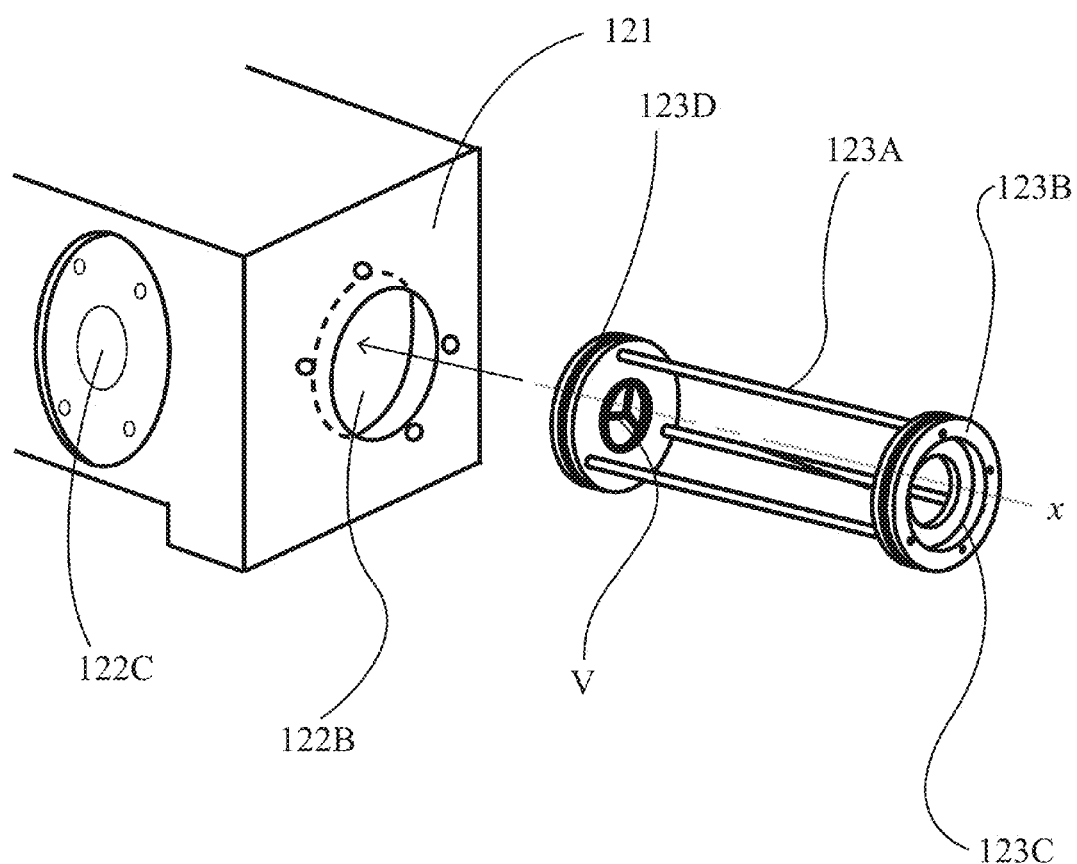
FIG. 4B is a perspective view of a contemplated valve module with its valve holder removed from its through channel, the valve holder having a valve secured thereupon.

FIGS. 4A and 4B disclose a valve module 120 having a block body 121, and two intersection through channels 129A, 129B. Through channel 129A has corresponding exiting holes 122A, 122B. Through channel 129B has corresponding exiting holes 122C, 122D. Within through channel 129A is disposed a valve holder 123. Valve holder 123 can be easily retrieved from the exiting hole 122B on the right side as shown in FIG. 4A. Referring now to FIG. 4B, valve holder 123 has a truss 123A, a valve holding piece 123D holding a prosthetic valve V, a fastening ring 123B having four screw holes to align with the four screw holes surrounding exiting hole 122B for fastening the valve holder 123 to the block body 121. The valve holder 123 preferably has a see-through viewing window 123C allowing a user to observe the valve during operation of the system in direction X. After the valve holder 123 is inserted and fastened back into block body 121, exiting hole 122B is effectively sealed and shut by the fastening ring 123B and the viewing window 123C.

One skilled in the art would immediately appreciate that there can be various other ways and structures for holding the valve V in the through channel 129A. The key is to positing the valve V in the circulating flow D such that the circulating flow D must pass through and cannot pass around the valve V.

It should be noted that having valve holders can be optional, since valves can also be replaced by permanently attached mechanical gates/one-way valve in any of the modules so as to achieve the same result of directing the circulating flow D to flow in one direction only. The use of valve holder 123, however, is critical in system 100 when the purpose of system 100 is to test/evaluate prosthetic valves. This is because in such systems there needs to be some means where a user can attach and reattach prosthetic valves.

Referring now back to FIG. 1; as discussed earlier, a user can selectively shut exiting hole of modules. For example, for the valve module 120 to work as the valve module in the upper right corner of the arrangement shown in FIG. 1, exiting hole 122D must be capped off with cap C.

Figure 5:
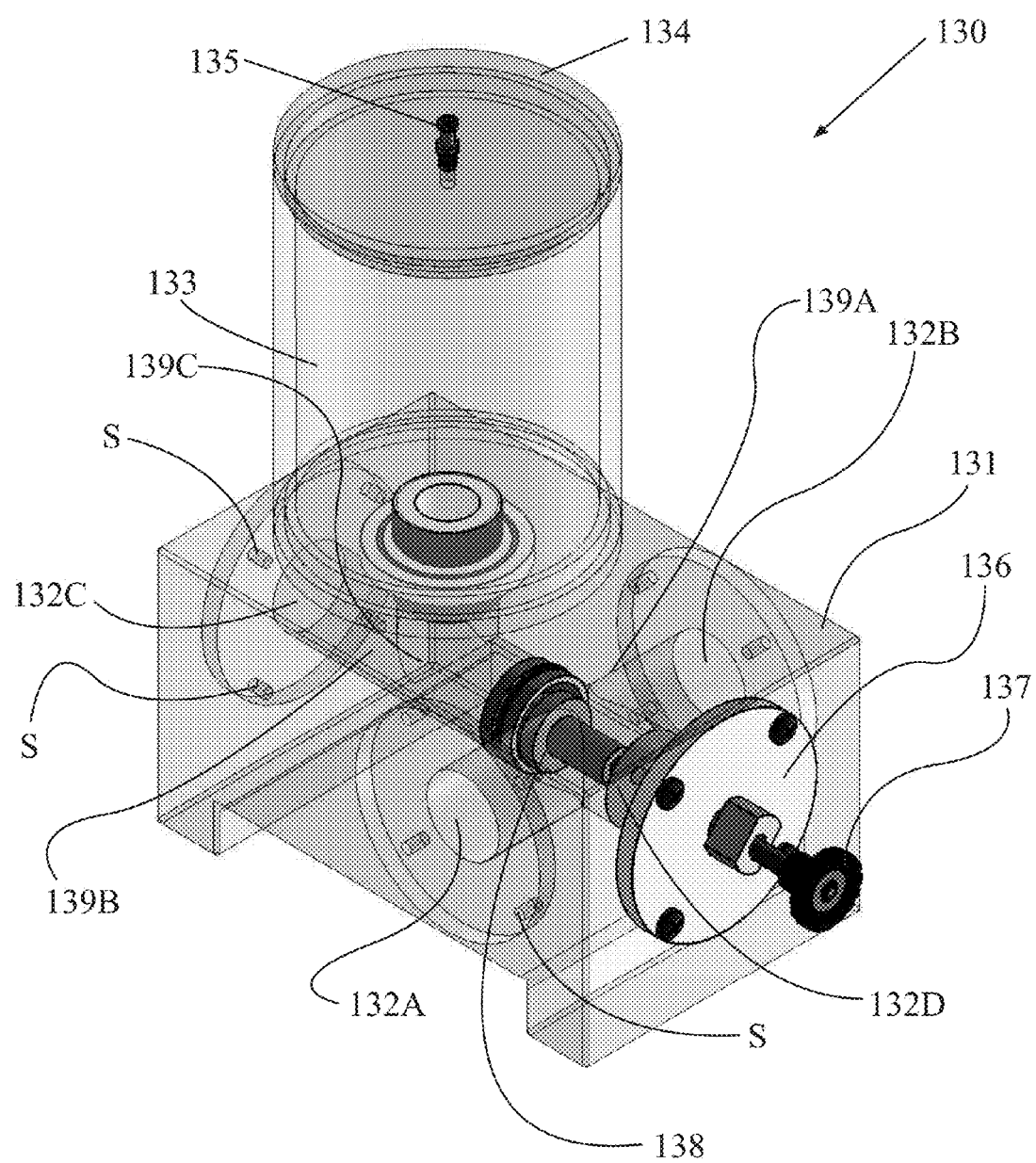
FIG. 5 is a perspective view of a contemplated compliance/resistance module.

FIG. 5 shows a module that combines a compliance chamber and a resistance mechanism 136 in one. The compliance/resistance module 130 has a block body 131, two intersecting through channels 139A, 139B, and exiting holes 132A, 132B, 132C, 132D. On top of the block body 131 is attached a compliance chamber in fluid communication 139C with through channel 139B. The purpose and use of compliance chamber and adjustable resistance mechanism is well known in prior art pulse duplicators. Here, the resistance has a user-adjustable knob 137 to longitudinally move plug 138 to apply flow resistance within its through channel to simulate blood flow resistance. The compliance chamber 133 has a lid 134 with an adjustable fitting 135 to release air inside the compliance chamber 133 should the user consider it necessary. As is known in the art, the purpose of the compliance module is to simulate blood vessel compliance.

The compliance/resistance module 130 as shown in FIG. 5 can also be used as peripheral compliance/resistance modules 130P as shown in FIGS. 1 and 11. Both serve the same function. Typically, the contemplated system would have more than a few free standing compliance/resistance modules 130 available for installation into the circulating flow, allowing the user sufficient versatility to build a desired cardiovascular hemodynamic simulation system.

As discussed above, the use of a compliance chamber 133 is to simulate blood vessel compliance. The use of the compliance chamber 133 can be optional for some applications. While the preferred embodiment includes a compliance chamber 133, there can be simulation models where a compliance module 133 is not absolutely necessary. This disclosure specifically contemplates a design without any compliance chamber 133.

Figure 6:
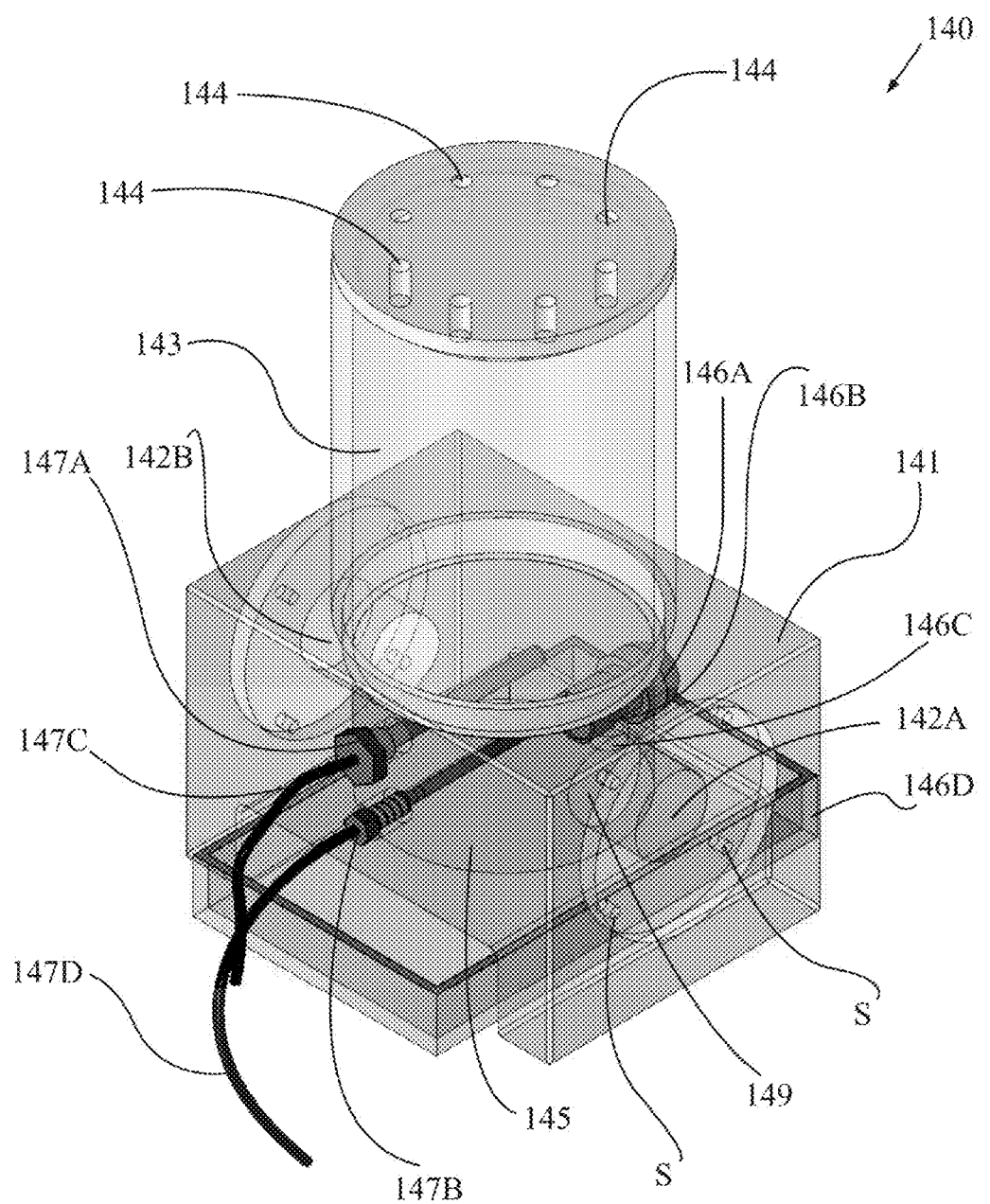
FIG. 6 is a perspective view of a contemplated reservoir connector having a heating rod and a pressure transducer disposed therein.

FIG. 6 is a reservoir module 140 having a block body 141, one through channel 149 having two existing holes 142A, 142B, and a reservoir 143, which has ventilating holes 144 on top. Within the block body where the through channel 149 and the reservoir 143 converge is a cylindrical chamber 145, within which is disposed heater 147A and pressure transducer 147B. Both the heater 147A and the pressure transducer 147B are electronically connected to the microprocessor via cables 147C, 147D. Fluid can be drained from cylindrical chamber 145 via drain valve 146B, manually adjustable using turning knob 146A. Fluid can be drained through port 146C and into removable pan 146D. The fluid reservoir 143 is disposed in fluid connection with its through channel 149 to simulate atrium function.

Figure 7:
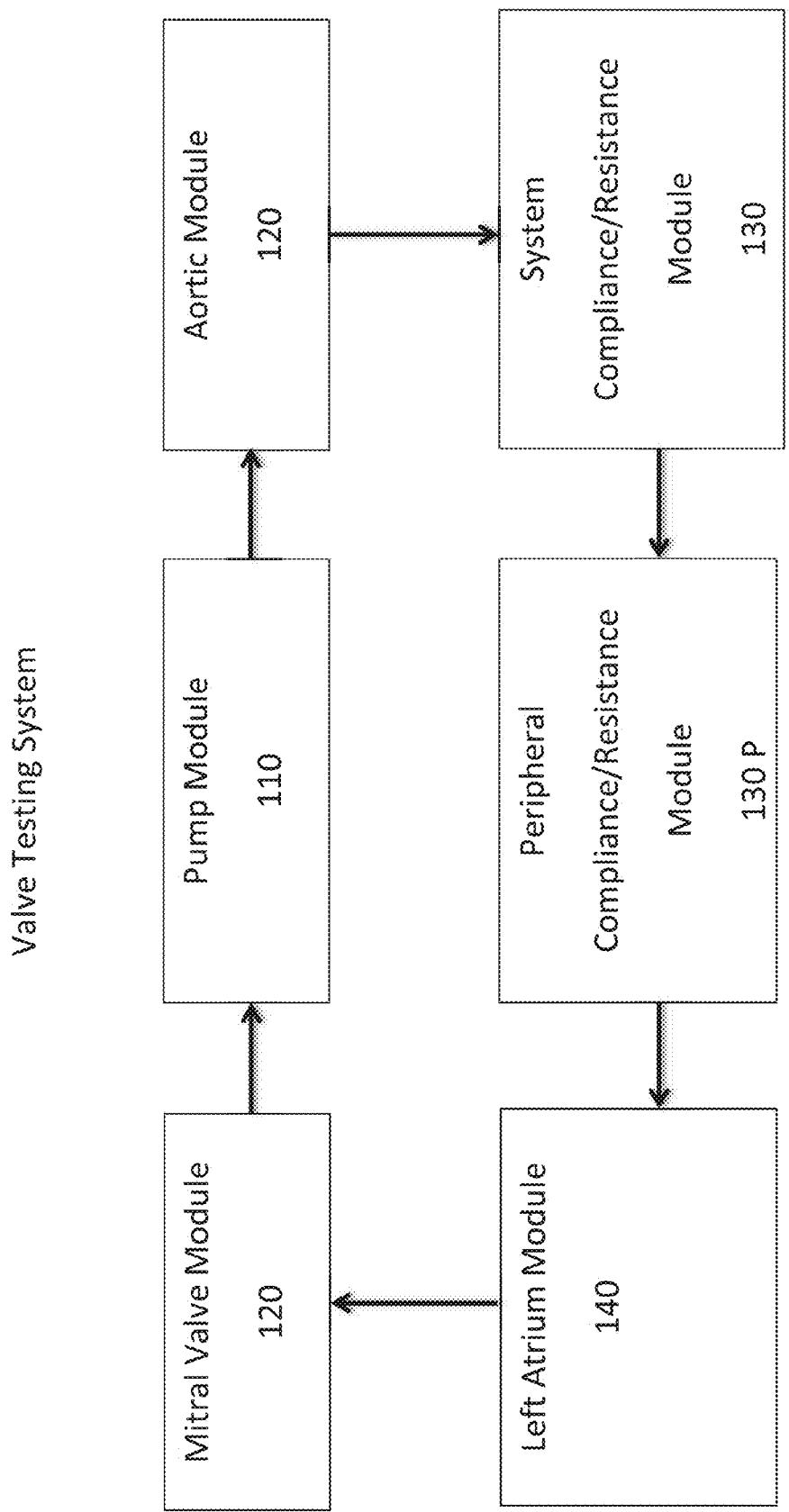
FIG. 7 is a block diagram illustrating one contemplated way to set up the various modules to create a valve testing system, having two modules each holding a prosthetic valve, while the rest of the modules coupled in a loop to simulate real life cardiovascular hemodynamic functions.
Figure 8:
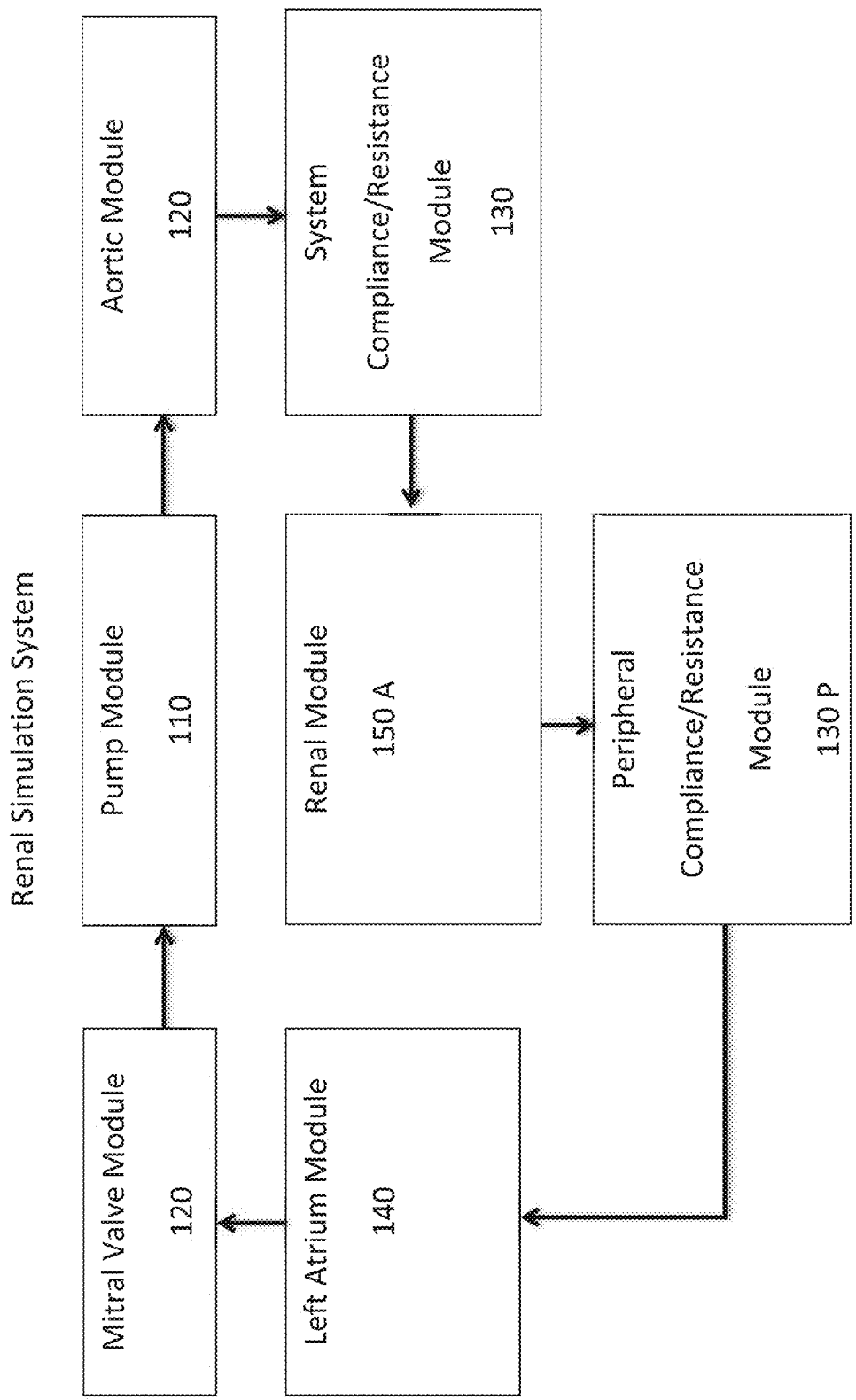
FIG. 8 is a is a block diagram illustrating one contemplated way to set up the various modules to create a renal simulation system, having a renal module inserted within the loop to simulate real life renal vasculature functions.

FIGS. 7 and 8 provide two examples of arrangements. In the valve testing system of FIG. 7, this arrangement is sufficiently effective and realistic to provide a cardiovascular hemodynamic simulation to test prosthetic valves which are installed in valve modules 120.

As discussed earlier, a key component of the instant invention is the ability to single out a human subsystem, or organ, for further detailed study/training. The way to achieve this is by inserting a peripheral module 150 into the contemplated circulating flow created as described above. Contemplated peripheral module 150 can be of a proprietary design, or it can simply be a known off-the-shelf prosthesis, or a known off-the-shelf silicon model.

In FIG. 8, a renal module 150A is disclosed. A renal module 150A can be any known anatomically similar structure that can simulate a renal vasculature.

Figure 9:
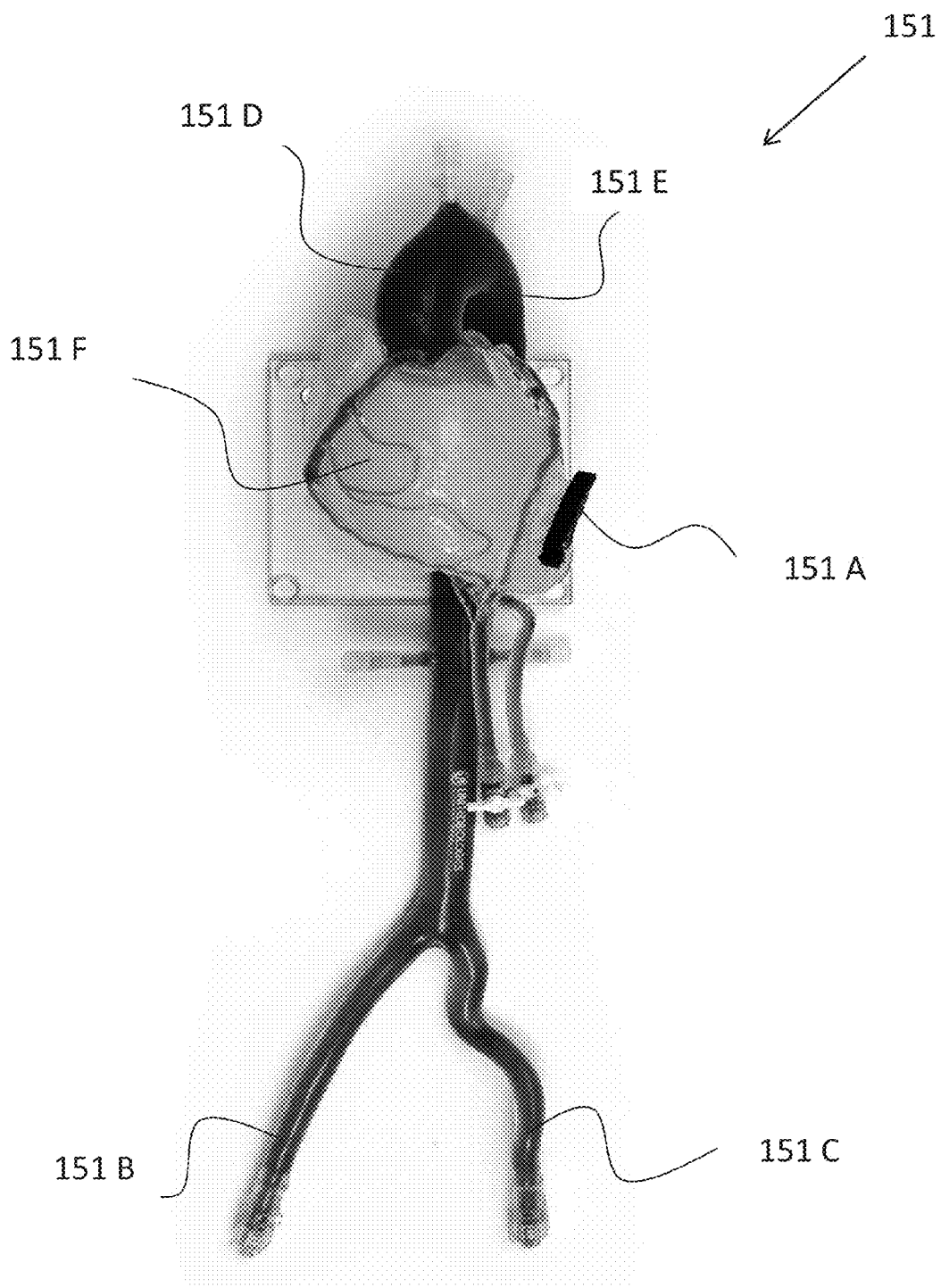
FIG. 9 is a PRIOR ART illustration of an off-the-shelf silicon coronary model. Anatomically-correct, anatomically-similar, or even anatomically incorrect models of human organ/subsystems are contemplated for use in combination with the instant inventive subject matter.

As just another example further illustrating a peripheral module 150, FIG. 9 shows a prior art off-the-shelf silicon model commercially available (e.g., from United Biologics, Inc. 15451 Red Hill Avenue, Suite B, Tustin, Calif. 92780, United States). Shown in FIG. 9 is an embedded coronary model having anatomically accurate pulmonary vein 151A, ascending aorta 151D, descending aorta 151E, iliac arteries 151B, 151C, and atrium 151F. This off-the-shelf coronary model can be "inserted" into, or forming part of the contemplated circulating flow by using known fittings, clamps, couplers, and connectors. All of the known methods/purposes of this silicon model outside the context of this invention can also be implemented with the instant invention. For example, after the silicon model of FIG. 9 is installed into system 100 as shown in FIG. 11, a researcher can deliver and implant a stent into the silicon model using appropriate tools, via appropriate ports. The method and apparatus involved in delivering a stent into the silicon model of FIG. 9 are known in the prior art and would be readily appreciated by one skilled in the surgical art, without further detail explanation herein.

FIG. 11 shows the coronary model 151 of FIG. 9 implemented into a system of contemplated modules of the instant invention. In FIG. 11, circulating flow D is fluidly connected to an anatomically accurate atrium 151F, and goes through ascending aorta 151D, and then through descending aorta 151E, and then pass down to iliac arteries 151B, 151C, both of which are fluidly coupled to a peripheral compliance/resistance module 130P, 130P, and then directed back to reservoir module 140. Once connected to the circulating flow D, a user can simulate transcatheter valve delivery or aortic stent delivery and function, under easily adjustable cardiovascular hemodynamics.

Figure 10:
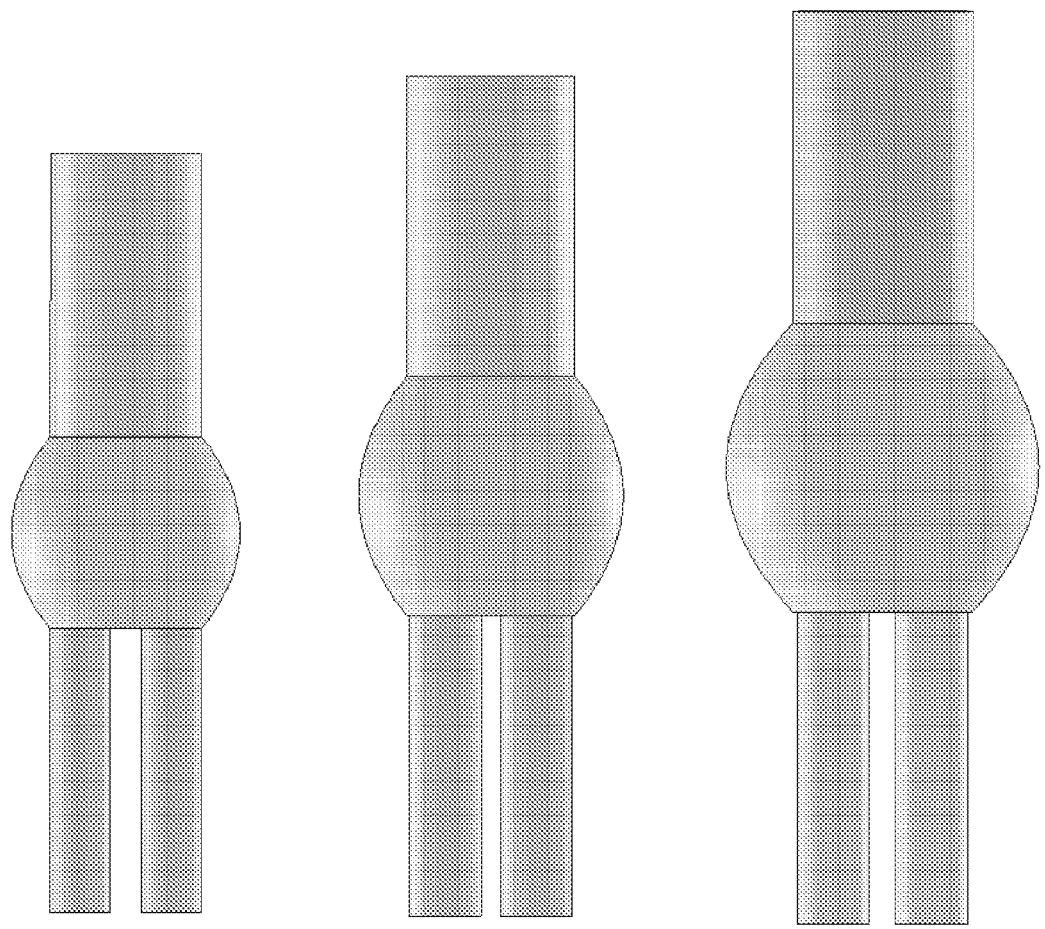
FIG. 10 is PRIOR ART illustration of off-the-shelf silicon bifurcated graft models. Anatomically-correct, anatomically-similar, or even anatomically incorrect models of human organ/subsystems are contemplated for use in combination with the instant inventive subject matter.

Still further contemplated peripheral modules can include off-the-shelf silicon models of mock arteries, mock vessels, left and right atriums and ventricles, pulmonary arteries, inferior vena cava, superior vena cava, subclavian, brachial and radial arteries, bifurcating vessel (see FIG. 10) such as those commercially available (e.g., from Metal Professionals, 3132 S. River Road W. South Range Wis. 54874, United States.

Another contemplated peripheral module is a coronary sinus module to simulate coronary stent delivery and function.

One skilled in the art would immediately recognize the broad range of application offered by the modular pulse duplicator system 100 disclosed herein. The inventive subject matter offers a method of using a pulse duplicator system to simulate cardiovascular hemodynamic functions for product demonstration, simulation study, and training. The method steps include providing a modular pulse duplicator system 100 comprised of a plurality of modules adapted to detachably and fluidly couple to each other, and wherein each module has at least one through channel 119, 129, 139, 149. The contemplated method further includes a coupling step whereby a user couples each of modules to at least two other modules such that the through channels 119, 129, 139, 149 of each module form a fluidly connecting circulating flow D.

Obviously there can be no liquid in the circulating flow before the modules are sealingly coupled together. Once all of the modules are coupled together, preferably forming a closed loop, a user would then fill a liquid into the system 100, preferably via reservoir module 140. And when a user is ready to disassemble the modules, the user would first drain the liquids from the system 100 via the drain as disclosed above.

As discussed above, the novel method requires that the modules in the system 100 can be uncoupled, and recoupled and rearranged with a different sequence or quantity of modules, to form yet another fluidly connecting circulating flow. Although only a limited number of possible arrangements are disclosed herein, one of ordinary skill in the art would readily appreciate other possible arrangements base on each user's experience and intended goal. The size, shape, and dimension of each module allow them to function like building blocks, easily connectable and arranged in a series, forming a loop. In some applications, these modules are arranged in parallel in some portion of the loop which they form.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different arrangement of modules, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Thus, specific embodiments and applications of modular pulse duplicator have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the invention. In addition, where the specification and claims refer to at least one of something selected from the group consisting of A, B, C . . . and N, the text should be interpreted as requiring only one element from the group, not A plus N, or B plus N, etc.

What is claimed is:

1. A multi-purpose versatile modular pulse duplicator system that simulates cardiovascular hemodynamic functions, the system comprising: a plurality of modules each having a first straight through channel, wherein the plurality of modules are detachably and fluidly coupled to each other forming a fluidly connecting circulating flow via said first straight through channel of each module; wherein at least two of the plurality of modules each have a second straight through channel crisscrossing in a right angle with the first straight through channel of the same module, and the first and second straight through channels of the same module are fluidly connected to each other; wherein each of said first straight through channels has an inflow port and an outflow port, and the inflow and outflow ports of the first straight through channels each have a diameter that is the same as a diameter of the first straight through channel; wherein the diameter of the first straight through channel is constant throughout an entire length of the first straight through channel; wherein each of said second straight through channels has an inflow port and an outflow port, and the inflow and outflow ports of the second straight through channels each have a diameter that is the same as a diameter of the second straight through channel; wherein the diameter of the second straight through channel is constant throughout an entire length of the second straight through channel; wherein at least one inflow or outflow port is covered by a cap; wherein one of the plurality of modules is a pump module having a linear motor disposed thereon to drive a fluid in the circulating flow; and wherein the plurality of modules are adapted to be detached from each other becoming free standing pieces, and be reattached to each other having a different sequence order or having a different quantity of modules, forming yet another fluidly connecting circulating flow via said first straight through channel of each module.

2. The modular pulse duplicator system as recited in claim 1 further comprising a plurality of universal connectors including fittings, pipes, and couplers, each having a through channel, said universal connectors are adapted to fluidly connect two of said plurality of modules.

3. The modular pulse duplicator system as recited in claim 1, wherein one of the plurality of modules has a compliance chamber disposed in fluid communication with its through channel, to simulate blood vessel compliance.

4. The modular pulse duplicator system as recited in claim 3, wherein one of the plurality of modules has an adjustable resistance mechanism to apply flow resistance within its first straight through channel to simulate blood flow resistance.

5. The modular pulse duplicator system as recited in claim 1, wherein one of the plurality of modules has a valve holder to hold a prosthetic valve in its first straight through channel.

6. The modular pulse duplicator system as recited in claim 5, wherein one of the plurality of modules has a fluid reservoir disposed in fluid connection with its first straight through channel to simulate atrium function.

7. The modular pulse duplicator system as recited in claim 1, wherein one of the plurality of modules is a peripheral module to imitate or simulate an anatomical body part or anatomical subsystem.

8. The modular pulse duplicator system as recited in claim 7, wherein the peripheral module is an ascending/descending aorta module to simulate transcatheter valve delivery or aortic stent delivery and function.

9. The modular pulse duplicator system as recited in claim 7, wherein the peripheral module is a coronary sinus module to simulate coronary stent delivery and function.

10. A method of using a pulse duplicator system to simulate cardiovascular hemodynamic functions for product demonstration, simulation study, and training, the method comprising: providing a modular pulse duplicator system comprised of a plurality of modules adapted to detachably and fluidly couple to each other, and wherein each module has a first straight through channel; wherein at least two of the plurality of modules each have a second straight through channel crisscrossing in a right angle with the first straight through channel of the same module, and the first and second straight through channels of the same module are fluidly connected to each other; wherein each of said first straight through channels has an inflow port and an outflow port, and the inflow and outflow ports of the first straight through channels each have a diameter that is the same as a diameter of the first straight through channel; wherein the diameter of the first straight through channel is constant throughout an entire length of the first straight through channel; wherein each of said second straight through channels has an inflow port and an outflow port, and the inflow and outflow ports of the second straight through channels each have a diameter that is the same as a diameter of the second straight through channel; wherein the diameter of the second straight through channel is constant throughout an entire length of the second straight through channel; and wherein at least one inflow or outflow port is covered by a cap; coupling each of said modules to at least two other modules such that the first straight through channel of each module forms a fluidly connecting circulating flow; providing a linear motor disposed on one of the modules to drive a fluid in the circulating flow; and providing the fluid within the circulating flow; wherein the system of coupled modules is adapted to be uncoupled, and recouped and rearranged with a different sequence or quantity of modules, to form yet another fluidly connecting circulating flow.

11. The method as recited in claim 10, wherein the coupling step includes coupling two modules together via a universal connector, wherein the universal connector has a through channel and is configured to fluidly connect two of the plurality of modules.

12. The method as recited in claim 10, wherein one of the modules has a compliance chamber to simulate blood vessel compliance.

13. The method as recited in claim 12, wherein one of the modules has a user-adjustable resistance mechanism to selectively apply a flow resistance in its first straight through channel to simulate blood flow resistance.

14. The method as recited in claim 10, wherein one of the modules has a valve holder to hold a valve within its first straight through channel, and said method further including installing the valve within the circulating flow using said valve holder.

15. The method as recited in claim 14, wherein one of the modules has a fluid reservoir fluidly connected to its first straight through channel to simulate atrium function.

16. The method as recited in claim 10, further comprising inserting and fluidly connecting a peripheral module into the circulating flow, wherein the peripheral module structurally simulates an anatomical body organ system.

17. The method as recited in claim 16, wherein the body organ system is an ascending or a descending aorta.

18. The method as recited in claim 16, wherein the body organ system is a coronary sinus.

* * * * *